United States Patent [19]

Nagai et al.

[11] Patent Number: 5,031,211
[45] Date of Patent: Jul. 9, 1991

[54] COMMUNICATION CIRCUIT SWITCHING OR PARALLEL OPERATION SYSTEM

[75] Inventors: Yasuhiro Nagai, Bunkyo; Ryoichi Sasaki, Fujisawa; Michio Suzuki, Yokohama, all of Japan; Shunichi Yosioka, New York, N.Y.; Noboru Mizuhara, Kawasaki, Japan

[73] Assignee: Hitachi, Ltd., Tokyo, Japan

[21] Appl. No.: 473,607

[22] Filed: Feb. 1, 1990

[30] Foreign Application Priority Data

Feb. 3, 1989 [JP] Japan .................................. 1-23839

[51] Int. Cl.⁵ ............................................ H04M 7/00
[52] U.S. Cl. .................................. 379/221; 379/207; 379/225
[58] Field of Search ................ 379/220, 221, 225, 32, 379/219, 207

[56] References Cited

U.S. PATENT DOCUMENTS 3,411,140 11/1968 Halina et al. ................... 379/221 X

*Primary Examiner*—James L. Dwyer
*Attorney, Agent, or Firm*—Fay, Sharpe, Beall, Fagan, Minnich & McKee

[57] ABSTRACT

The communication system has a plurality of sub-networks, for example composed of transmission communication nodes, PBX communication notes, application communication nodes, and the like, respectively. Each of these sub-networks is managed by a management system, and all of the management systems are managed by an integrated management system. Each communication node is autonomously provided with the function of establishing an emergency routing as a first stage routing control on the occurrence of a failure in a circuit affecting the communication node. The autonomous routing is heirarchial with respect to node types. Failure and the influences of failure are reported to the sub-network management systems, which in turn can report to the integrated management system. As a second stage of routing control, one or more of the management systems establishes a global routing to replace the emergency local routing. The global routing may take effect if the managment system determines that the failure cannot be corrected within a substantially fixed period of time.

50 Claims, 14 Drawing Sheets

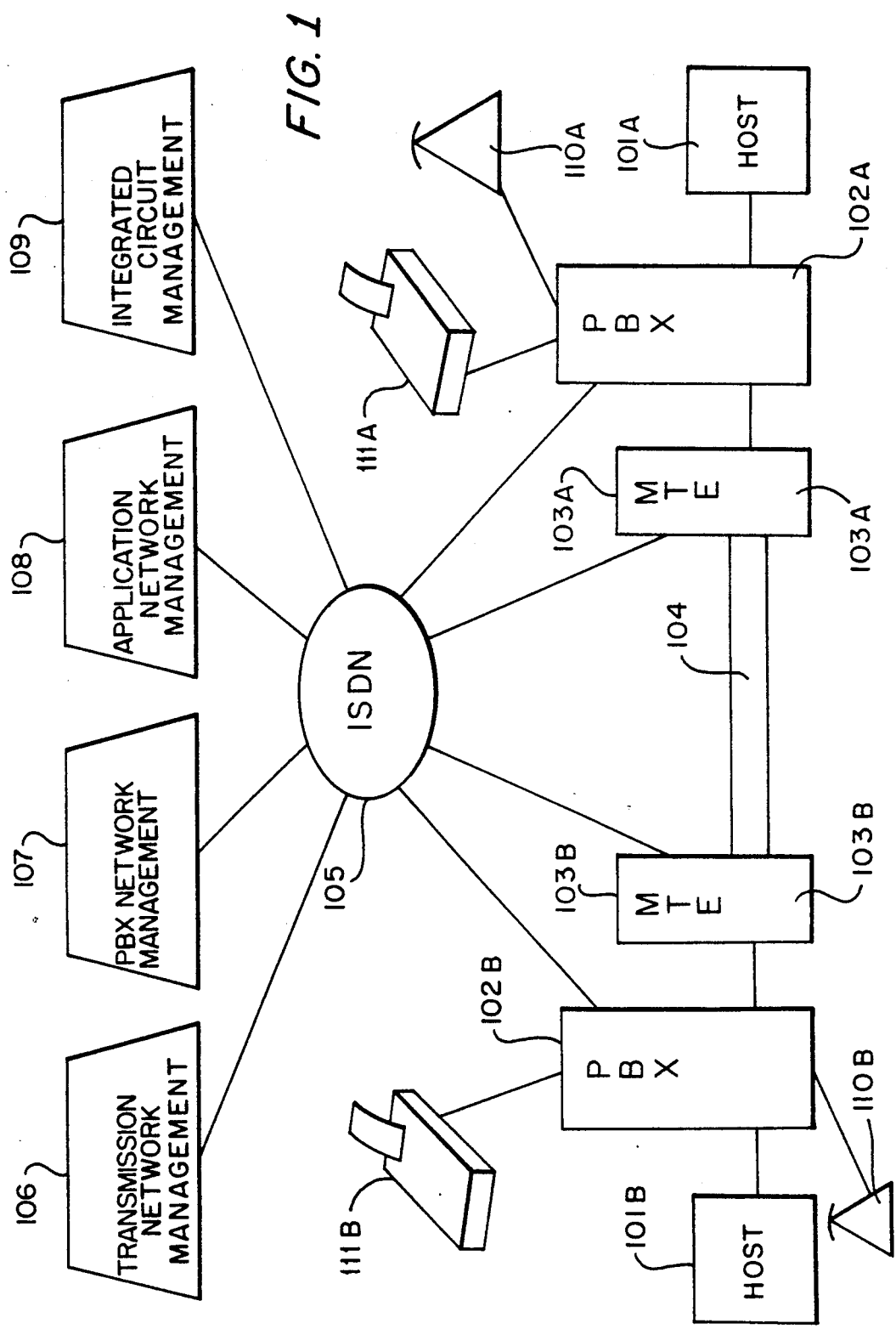

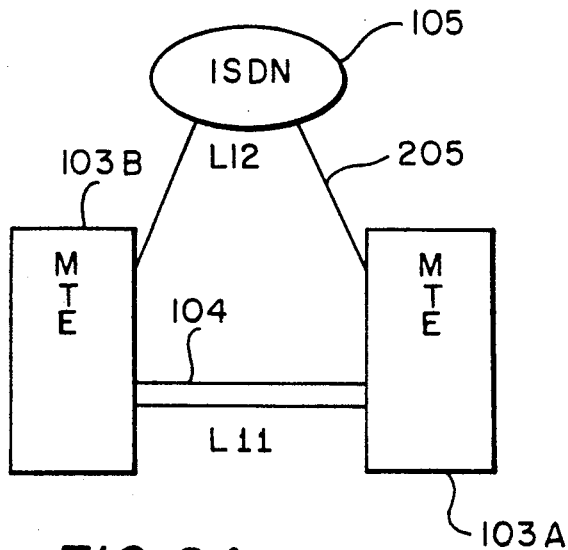
FIG. 2A
FIG. 2B
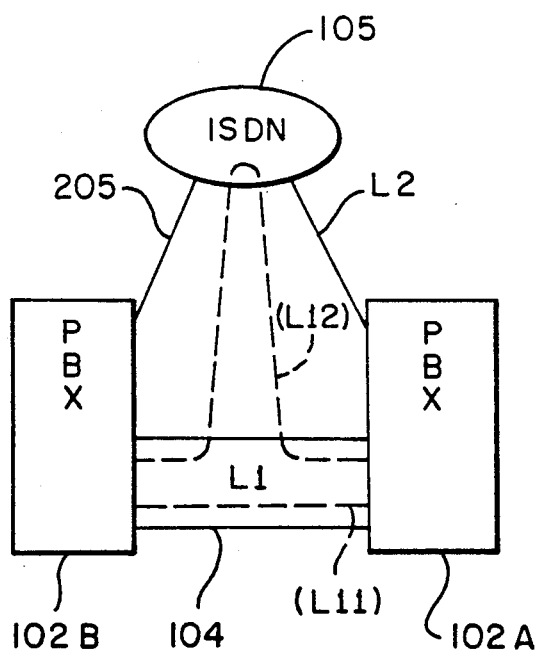
FIG. 2C
FIG. 2D

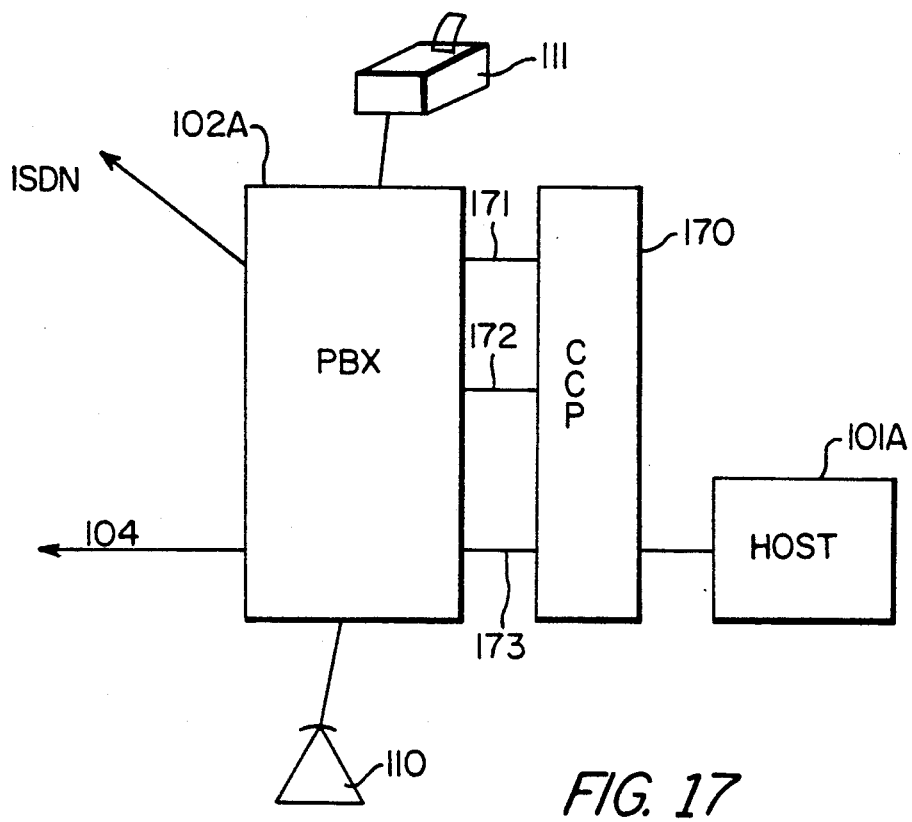
FIG. 17
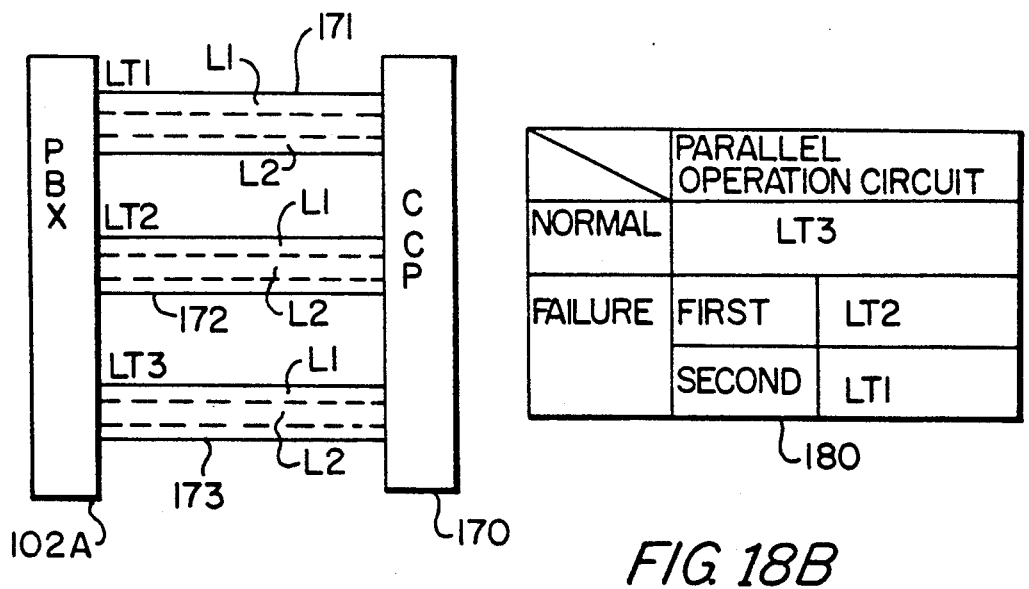
FIG. 18A
FIG. 18B

COMMUNICATION CIRCUIT SWITCHING OR PARALLEL OPERATION SYSTEM

BACKGROUND OF THE INVENTION

This invention relates to managing a communication network of communication nodes, transit trunks for the communication between the communication nodes, and subscribers' circuits connected to the communication nodes, when each communication nodes has an autonomous circuit switching or parallel operation function. More particularly, the present invention relates to a circuit switching or parallel operation system for coping rapidly with any circuit failures and for accomplishing effective and efficient circuit utilization.

Throughout this specification: failure will refer to circuit failures, equipment failures, overflow traffic, and the like disruptions in expected network communication; routing will refer to circuit switching, establishing parallel circuits and other changes in information flow paths within the networks.

A conventional communication circuit routing system, at the time of failure, is of either: (1) the type where each communication node executes autonomous routing; or (2) the type where each of the network management systems for managing a transmission network, an exchange network and an application network, respectively, issues routing commands to the corresponding communication nodes. Routing is disclosed in Japanese Patent Application No. 93046/1987.

SUMMARY

In the conventional system where each communication node conducts autonomous routing on the basis of local conditions of peripheral equipment and circuits, the routing is not necessarily the most effective and efficient circuit selection from the viewpoint of the communication network as a whole.

In the case of the system using the network management system, failure information is collected from each communication node to specify the failure position and decide the best routing before issuing a routing command to each communication node. Accordingly, though effective and efficient selection is possible, a long time is necessary to cope with the failure.

In a network management system for managing a communication network including communication nodes having an autonomous communication circuit switching or parallel operation function, the present invention combines the routing functions of the network management systems and autonomous nodes with one another to permit rapid emergency measures at the node level for circuit failures and efficient circuit selection for the total communication network at the management level.

To accomplish the objects described above, the autonomous routing function by the communication node is preferred as the first stage for emergency measures upon failure. As the first stage a communication node of the lower level first operates when the communication network is divided into a three level to the higher level hierarchy, that is, the transmission network level, the exchange network level and the application network level from the lower level to the higher level in the order named.

A sub-network management system is provided to each of the transmission network, the exchange network and the application network, and there is an integrated network management system for managing these sub-network management systems. Each sub-network management system collects the information within its network on the location of failure and on the first stage routing executed autonomously by the communication node, and then it reports this information to the integrated network management system. Each sub-network management system transmits the second stage routing command from the integrated network management system to the communication node that conducted the first stage routing. The integrated network management system has the functions of: searching a stand-by route as viewed based on the communication network as a whole from the operation information of the network obtained from each lower order sub-network management system; making cost/performance evaluation of the present route (the first stage route in this case) and the stand-by route by use of the circuit efficiency, circuit speed and circuit quality as the evaluation parameters; selecting the optimal route having high evaluation (the second stage communication circuit route); and giving a routing command to each sub-network management system.

When any failure occurs in the communication network there is secured a stand-by route to minimize the influences resulting from the interruption of communication, and there is quick autonomous routing by the communication node, with routing being carried out in the first stage by the communication nodes belonging to the lower hierarchy. The change of the structure of the network can be limited within the minimum range at the lower order level of the first stage and the influences on the upper order level can be prevented when the network management system specifies the failure is likely to be of short disruption and the second stage is not started.

On the other hand, if the restoration of failure is judged to take a long time, the resources other than those of the portion of failure are utilized effectively and re-construction of the communication network in the optimal operation state becomes important. The present invention then executes the optimal route from the aspect of the total communication network, by the second stage function of the integrated network management system.

BRIEF DESCRIPTION OF THE DRAWINGS

Further objects, features and advantages of the present invention will become more clear upon the following detailed description of preferred embodiments as shown in the drawings, wherein:

FIG. 1 is a view of the communication network to which the the present invention is applied;

FIGS. 2(A)–(D) explain the relation between the circuit switched by a multiple transmission equipment/PBX and switch command tables;

FIG. 17 is a view of the communication network;

FIG. 18(A) and (B) explain the switch command table for switching the circuits by the CCP;

DETAILED DESCRIPTION

Figure 3:
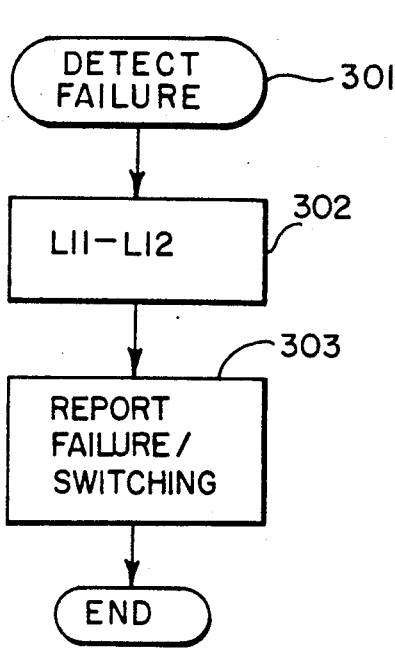
FIGS. 3 to 7 are flowcharts of circuit switching.

FIG. 1 shows a communication network as the application of the present invention. Host computers 101A, 101B, telephones 110A, 110B and facsimiles 111A, 111B as examples of the user equipment at the ends of the communication network are mutually connected through private branch exchanges, PBX's 102A, 102B, multiple transmission equipment 103A, 103B, a high speed digital circuit 104 and an ISDN (Integrated Services Digital Network) 105.

A transmission network management system 106 manages the transmission network composed of the multiple transmission equipment 103A, 103B as communication nodes, a PBX network management system 107 manages an exchange network composed of PBX's 102A, 102B as the communication nodes, and an application network management system 108 manages an application network comprising the host computers 101A, 101B, the telephones 110A, 110B and the facsimiles 111A, 111B as application nodes. Furthermore, an integrated network management system 109 manages the communication network by communicating with each of these network management systems 106–108. Each of the network management systems described above has a processor which operates in accordance with a predetermined program. Each network management system 106–109 is connected to the ISDN 105 through ISDN interface, and sub-network management systems 106–108 exchange management/control information with equipment to be managed through ISDN 105, that is with nodes. On the other hand, the integrated network management system 109 exchanges the management/control information with each subnetwork management system 106–108 through the ISDN 105.

FIGS. 2(A),(B) and (C), (D) show the correspondence of the circuit routes of the multiple transmission equipment 103A, 103B and PBXs 102A, 102B to the switch tables 203, 204, respectively. Normally, nodes 103A, B and 102A, B use route L11 of the high speed digital circuit 104, and they use route L12 of ISDN 105 as the stand-by circuit at the time of failures.

Next, an example of the routing of the present invention will be explained with reference to FIGS. 3 to 9.

Figure 4:
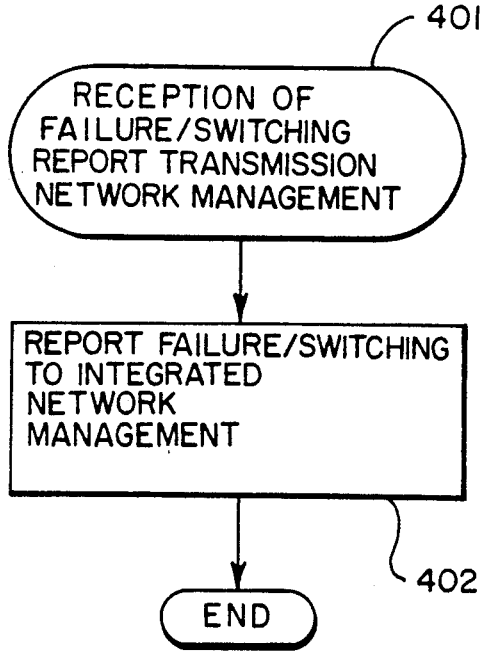
Figure 5:
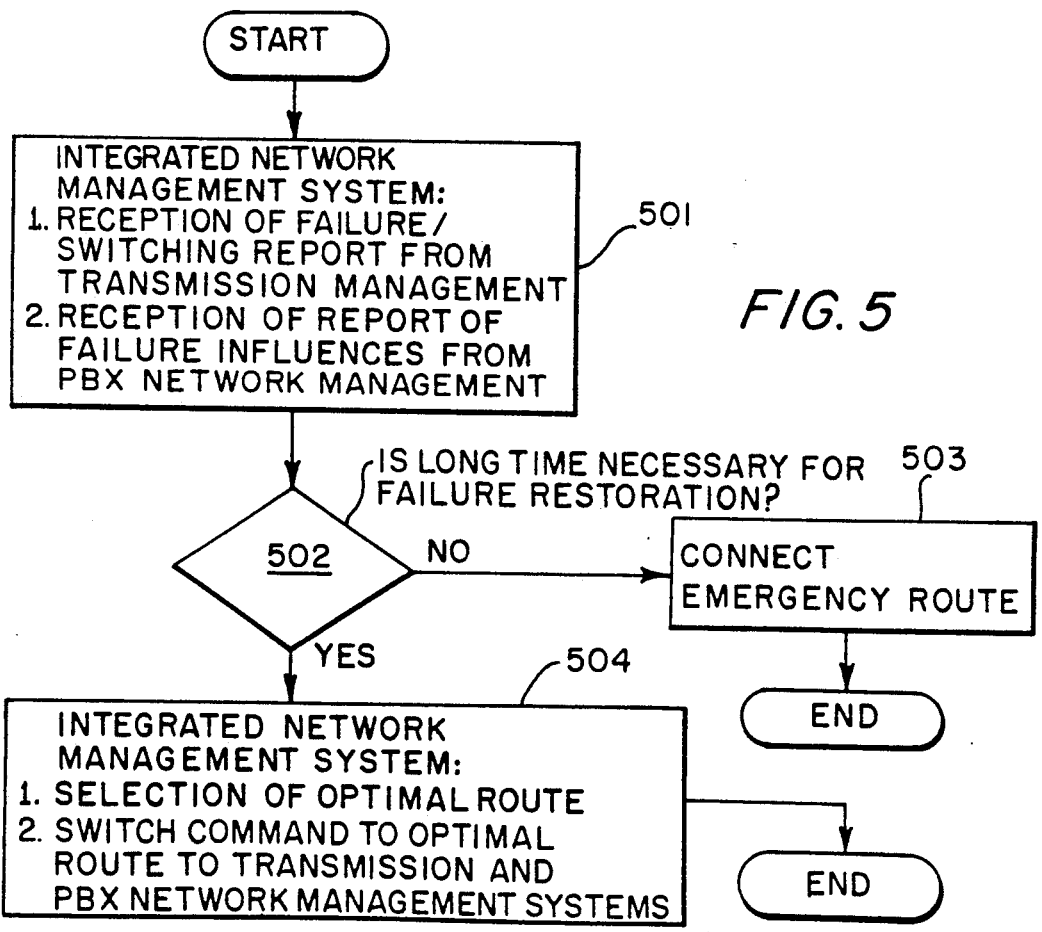
Figure 6:
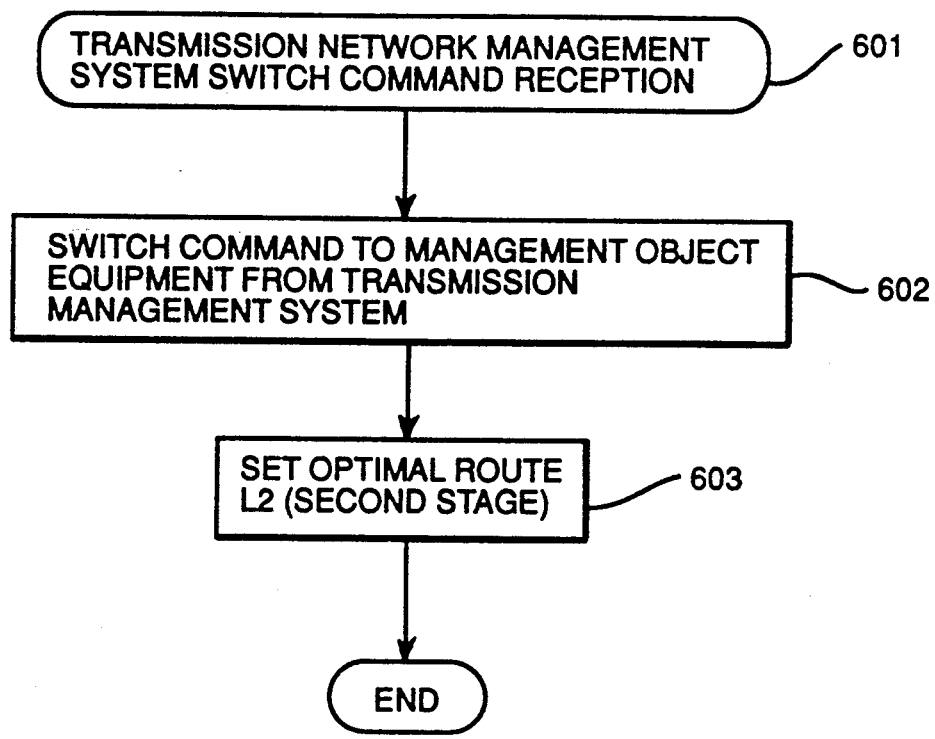
Figure 7:
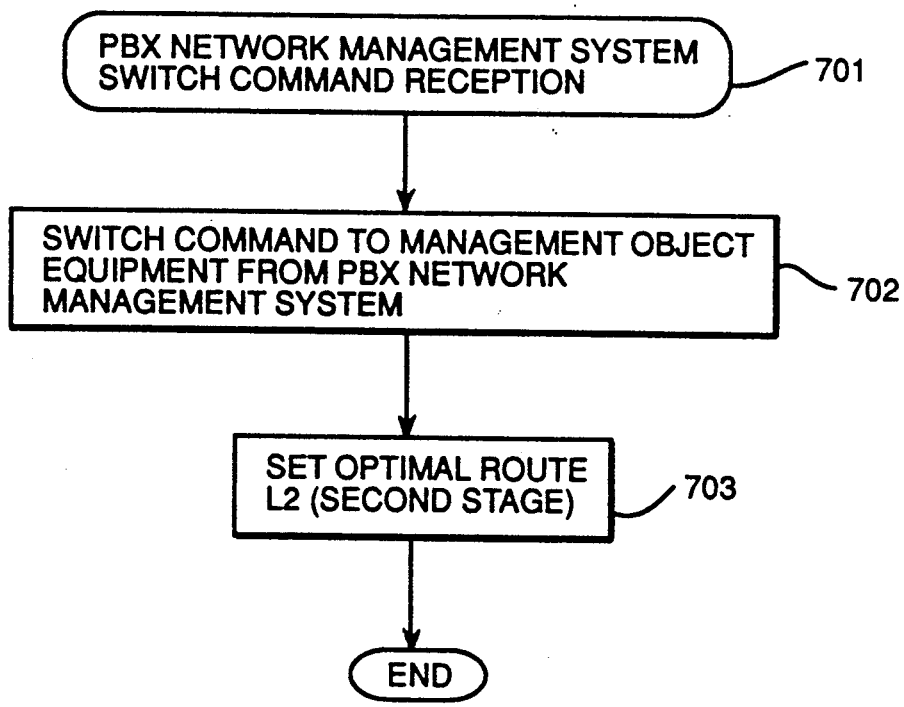

FIG. 3 shows the autonomous operation of the multiple transmission equipment 103A, B to cope with the circuit failures, FIGS. 4 and 6 show the autonomous operation of the transmission network management system 106, FIG. 5 shows the autonomous operation of the integrated network management system 109, and FIG. 7 shows the operation of the PBX network management system 107.

Figure 8:
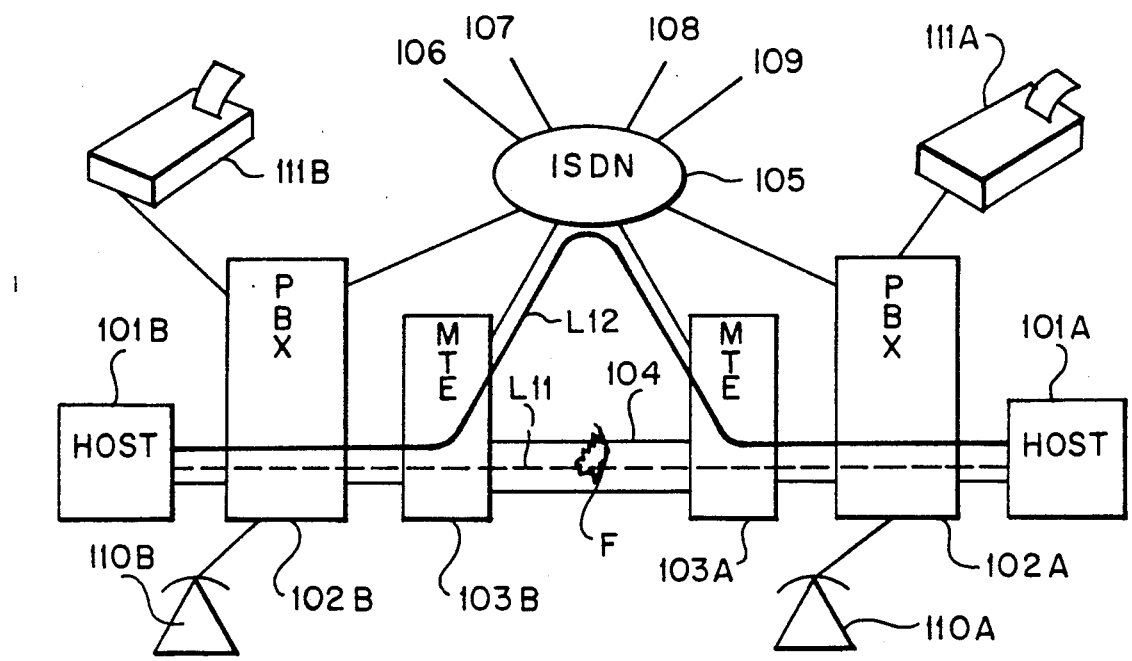
FIG. 8 is a block diagram showing the route selected by the circuit switching function of the multiple transmission equipment.

When any failure F occurs in an L11 circuit as shown in FIG. 8, for example, the multiple transmission equipment 103A or 103B, operating according to FIG. 3, first detects this failure (step 301), switches autonomously the circuit from L11 to the L12 in accordance with a predetermined switch table 203 of FIG. 2 (step 302) and secures a communication circuit as routing for the first stage emergency measures. Here, though PBXs 102A and 102B have the autonomous routing switch function, they are not actuated unless the multiple transmission equipments fail, because a timer from the occurrence of the failure to the start of the switch function and the number of times of resending after failure are set in advance to hieraraceal values. In other words, if the set time of the switch function start timer of the multiple transmission equipment is T1, the set time T2 of the switch function start timer of PBX has a relation $T1+T<T2$, and T is set to the time necessary for the switch processing of the multiple transmission equipment.

On the other hand, each multiple transmission equipment 103A, B reports the failure and the routing, e.g. switch operation to the transmission network management system 106 (step 303). Receiving this report (step 401 of FIG. 4), the transmission network management system 106 reports this to the integrated network management system 109(step 402). As shown in FIG. 5, the integrated network management system receives the report of the failure and the switch operation from the transmission network management system 106 and receives the examination report about the influences of the failures from the PBX network management system 107 (step 501). Here, whether or not a long time is necessary for restoring the failure is judged (step 502) and if the failure can be restored in a short period, the route (L12) of emergency routing measures is secured or maintained until restoration (step 503). If it takes a long period to restore the normal circuit L11, an optimal route as viewed from the total network is selected and a routing command, e.g. switch command is issued (step 504).

A circuit failure restoration time is defined according to the failure mode and the circuit type. For example, disasters (earthquakes, fires, etc.) involve a long time necessary for failure restoration (global failures). System failures involve a short time necessary for failure restoration (local failures). Major system failures have a necessary long time, and minor system failures have a necessary short time for failure restoration. In general, failure restoration time of a public circuit is longer than failure restoration time of a private circuit. This invention defines the mean failure restoration time Tij according to each circuit type i and each failure mode j. Examples of the circuit switching function of the integrated network management system conducted by the predetermined tij are given in Table 0. The integrated network management system receives the report of the failure information including the failure circuit type and the failure mode from sub-network management systems. Whether or not a relation of Tij and t is Tij>t (t=predetermined mean time necessary for the optimal circuit switch processing) is judged and if the relation is Tij<t (short time restoration), the route of emergency measures is secured or maintained until restoration. If the relation is Tij>t (long time restoration), an optimal route as viewed from the total network is selected and the switch command is given to the sub-network management systems.

TABLE 0

| Circuit Type | Failure Mode | | | |
|---|---|---|---|---|
| | Mode A | Mode B | Mode C | Mode D |
| Private Circuit (A) | TAa | TAb | TAc | TAd |
| Public Circuit (B) | TBa | TBb | TBc | TBd |
| ISDN (C) | TCa | TCb | TCc | TCd |

To evaluate the route Li in the integrated network management system 109, a communication circuit utilization cost Xi (a relative value when the most expensive circuit used is 1 and the most economical circuit is 100), circuit efficiency X2 (%), circuit speed X3 (a relative value when the highest speed circuit used is 100 and the lowest speed circuit is 1) and circuit quality X4 are used as the evaluation parameters, for example. The following evaluation formula is used with the weight of each of these evaluation parameters being a1-a4, respectively, to obtain the evaluation value I(Li) the following optimal route selection algorithm is used, for example:

$$I(L_i) = (a_1) \cdot (X_1) + (a_2) \cdot (100 - X_2) + (a_3) \cdot (X_3) + (a_4) \cdot (X_4)$$

Figure 9:
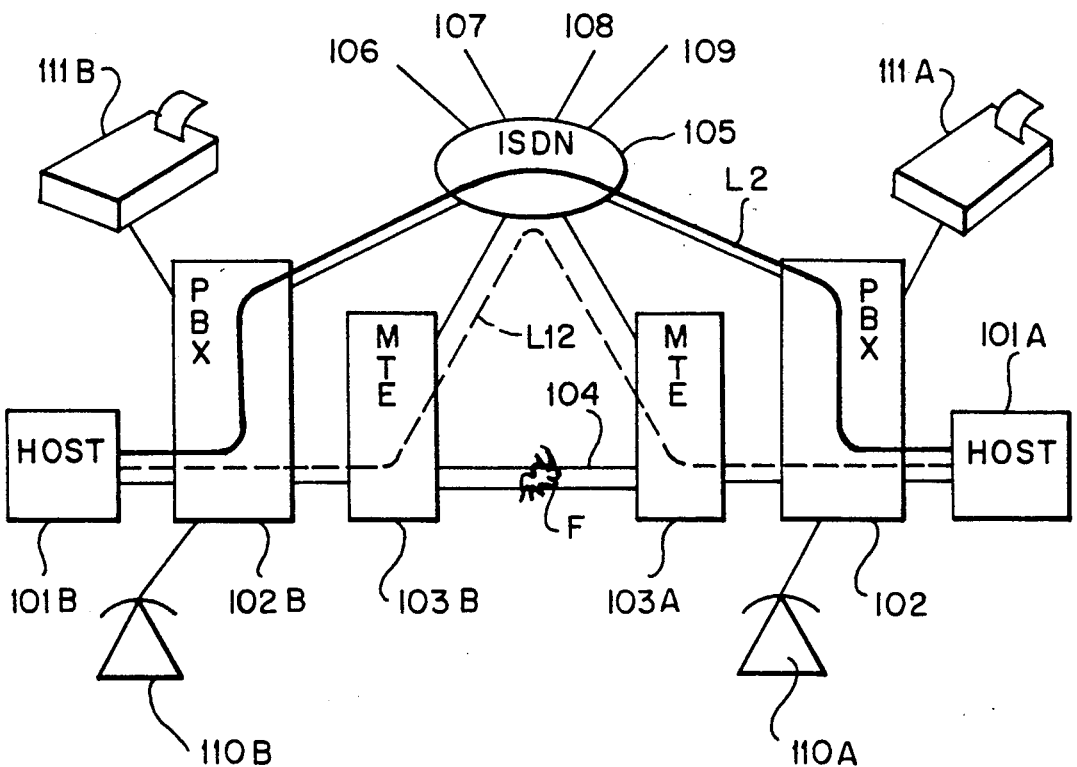
FIG. 9 is a block diagram showing the optimal route for which the switch command is given by an integrated network management system.

Here, the evaluation parameters $X_1$, $X_3$ and $X_4$ are fixed, e.g. at the time of setting the circuit, but $X_2$ changes dynamically with the operation. The evaluation value I(Li) is calculated for each of those routes which can be the stand-by route and the route having the greatest evaluation value is selected as the optimal route by system 109. In this embodiment, the stand-by routes are the L12 circuit and the L2 circuit as shown in FIG. 9. Assuming that their respective evaluation parameters and weight are given as tabulated in Table 1 below, the evaluation value of the L12 circuit is "530" and that of the L2 circuit, "675". Thus, the L2 circuit is selected as the optimal route.

TABLE 1

| Circuit | $X_1$ | $X_2$ | $S_3$ | $X_4$ |
|---|---|---|---|---|
| L12 | 60 | 50 | 80 | 90 |
| L2 | 80 | 10 | 80 | 95 |
| weight Ai | 3 | 2 | 2 | 1 |

The optimal route, i.e. the L2 circuit, is selected in accordance with the optimal route selection algorithm based on the collected information described above in consideration of the cost and performance in the present network, and the switch command to switch from the L12 circuit to the L2 circuit is outputted to the transmission network and PBX network management systems 106, 107 (step 504). The transmission network management system 106 and the PBX network management system 107 receive the switch command from the integrated network management system 109 described above (steps 601, 701), respectively, as shown in FIGS. 6 and 7. The switch command is then sent to the transmission and PBX nodes responsible for switching, respectively (steps 602, 702) and the optimal route L2 is set as shown in FIG. 9 (steps 603, 703).

Due to the construction and operation described above, the communication nodes having autonomous routing can be utilized effectively and the stand-by route can be secured instantaneously (first stage) at the time of the circuit failures by adjusting the switch timing between the transmission network and exchange network. If a long time is necessary for the restoration after failure, the network management system switches the route to the optimal route (second stage) and the effective and efficient use of the communication circuit as viewed from the total communication network can be accomplished.

The same system thus far described with respect to a circuit continuity failure can also cope with the circuit failure caused by overflow traffic and its operation will be explained with reference to FIGS. 10 to 16. The system configuration is the same as that already described and the indication table of the parallel operation autonomously by each node equipment is the same as in FIG. 2.

Figure 10:
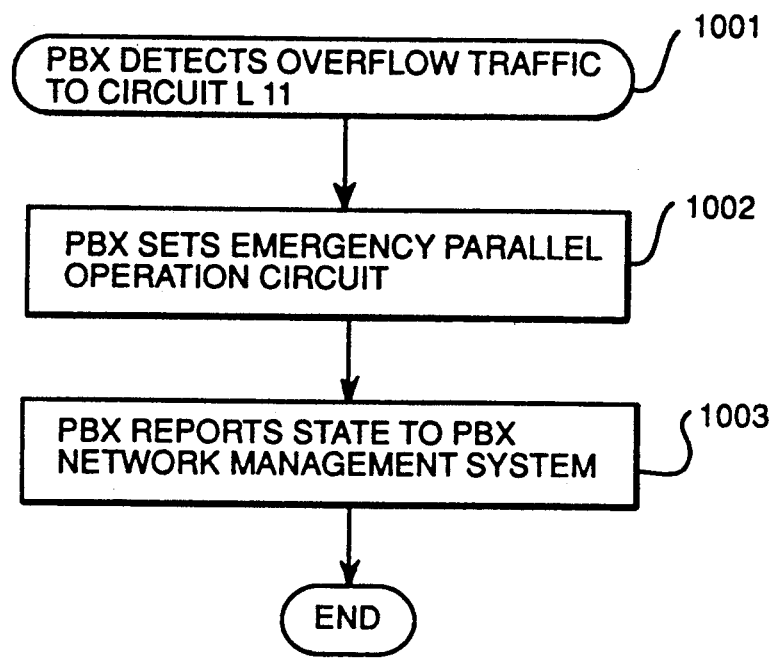
FIGS. 10 to 14 are flowcharts of parallel operation when the PBX detects an overflow traffic.
Figure 11:
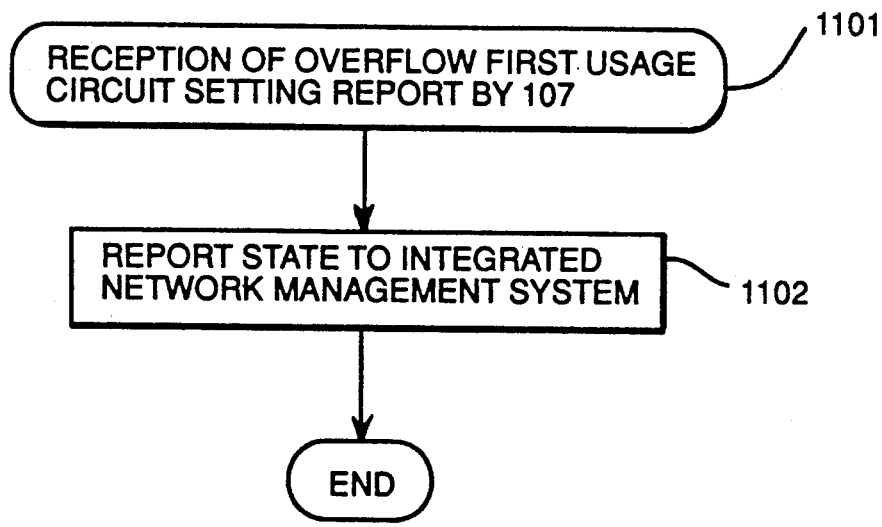
Figure 12:
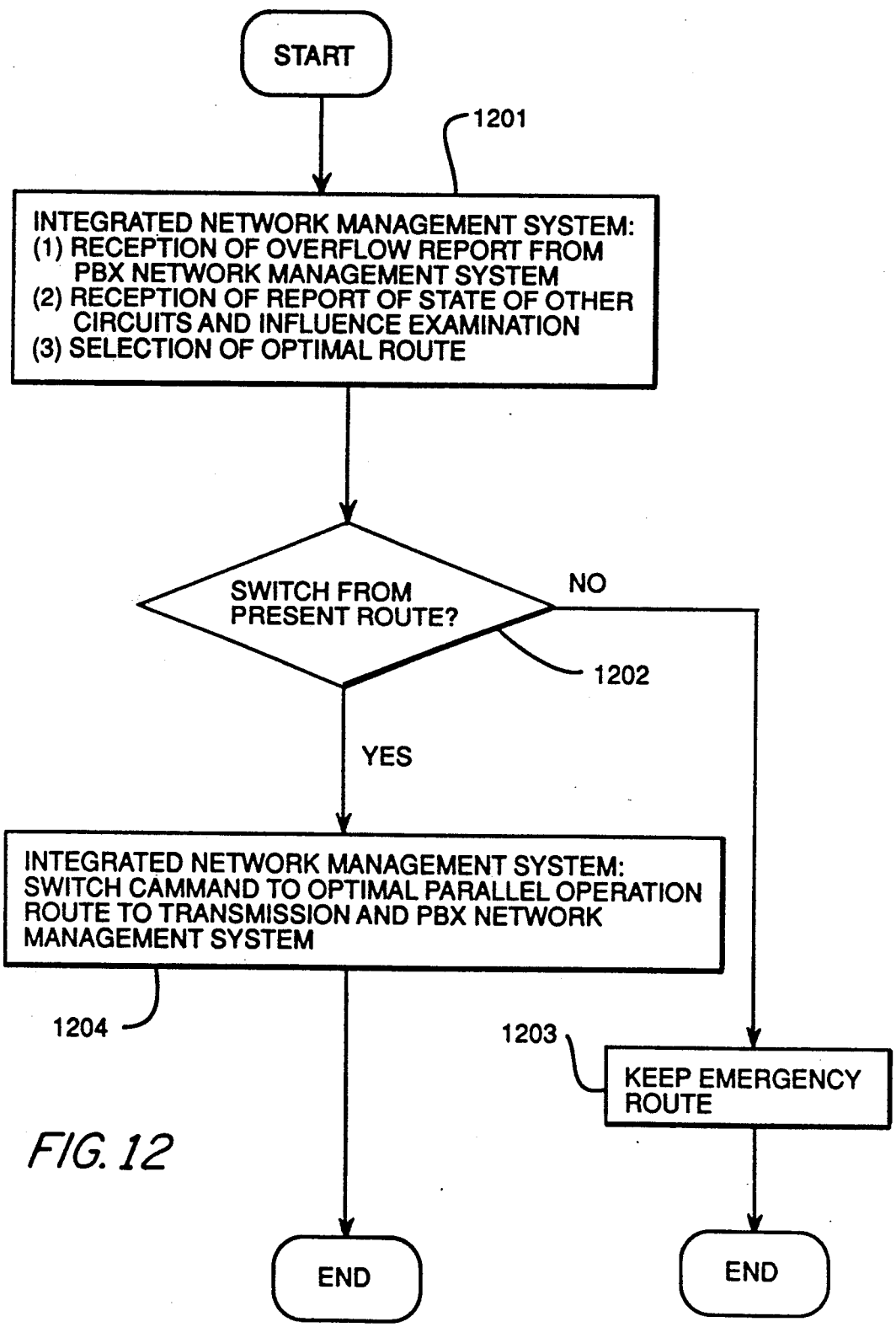
Figure 13:
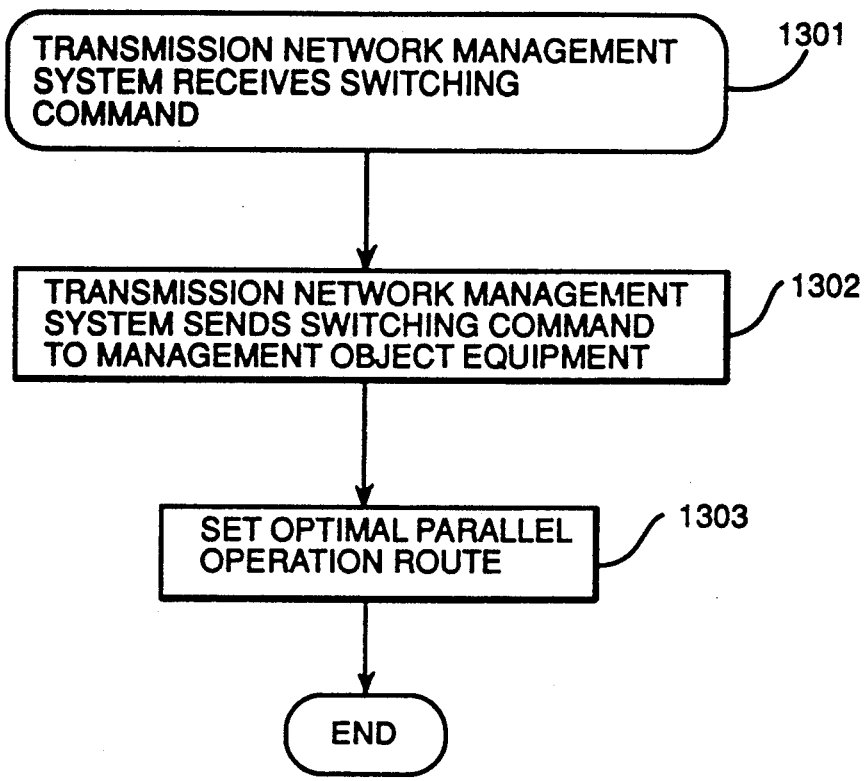
Figure 14:
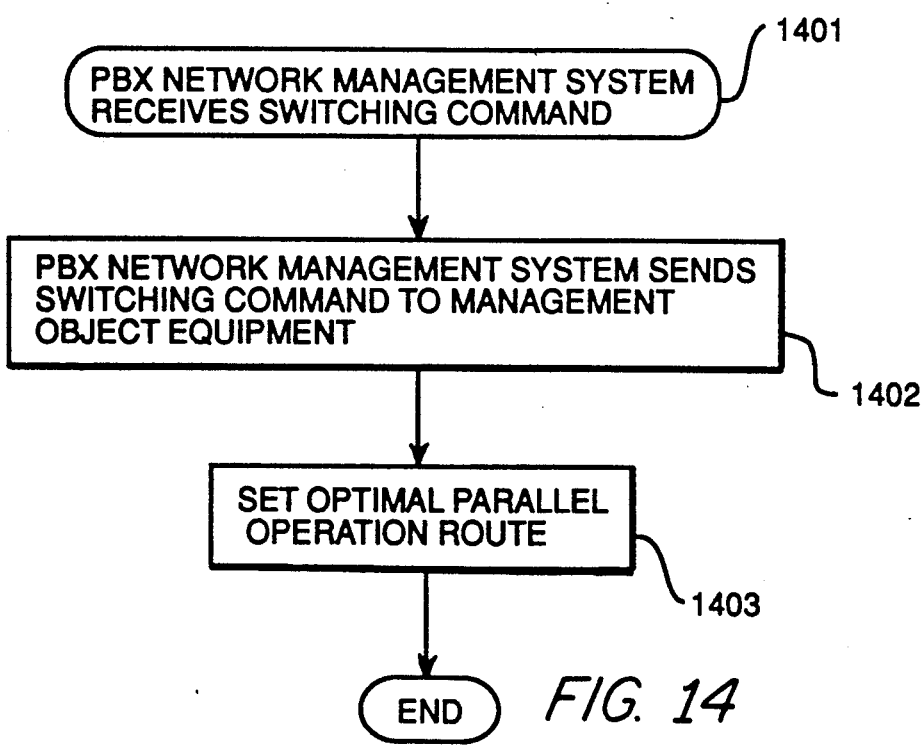
Figure 15:
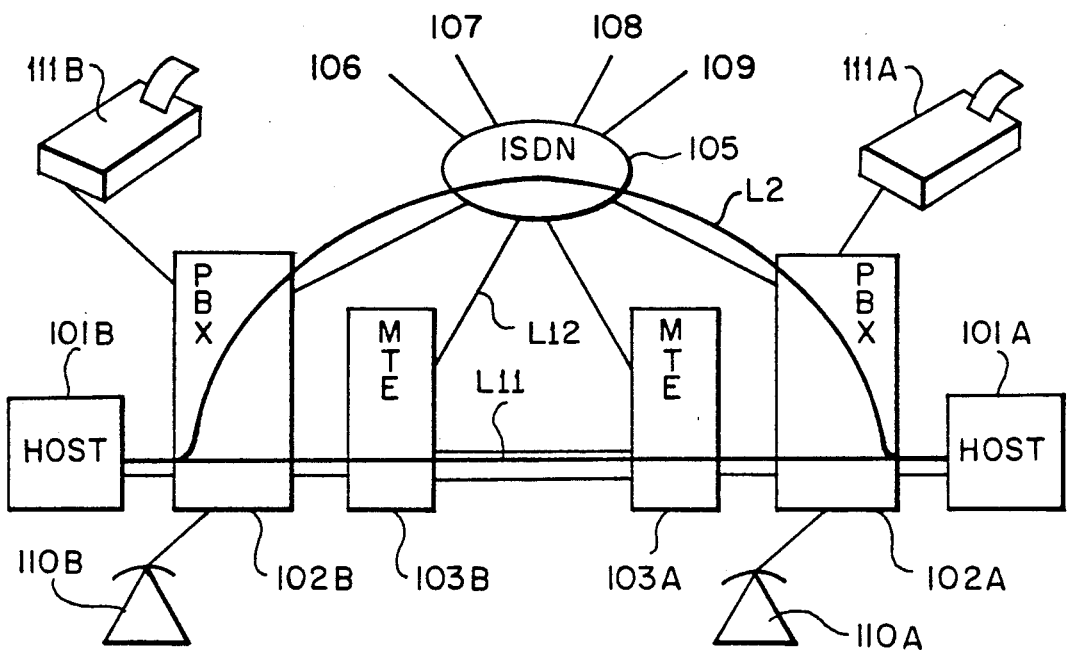
FIG. 15 is a block diagram showing the route selected by the circuit parallel operation function of the PBX.

FIG. 10 shows the operation of PBX 102A when an overflow traffic failure is detected from the circuit using the high speed digital circuit 104. FIGS. 11 and 14 show the operation of the PBX network management system. FIG. 12 shows the operation of the integrated network management system 109. FIG. 13 shows the operation of the transmission network management system. When, for example, the overflow traffic failure F for the L11 circuit occurs and PBX 102A detects this overflow (step 1001 of FIG. 10) as shown in FIG. 15, the PBX first autonomously sets the L12 circuit as the parallel operation circuit in accordance with a predetermined circuit parallel operation use table 203 and secures the parallel operation route as the emergency routing of the first stage (step 1002). The PBX reports the status to the PBX network management system 107 (step 1003).

Figure 16:
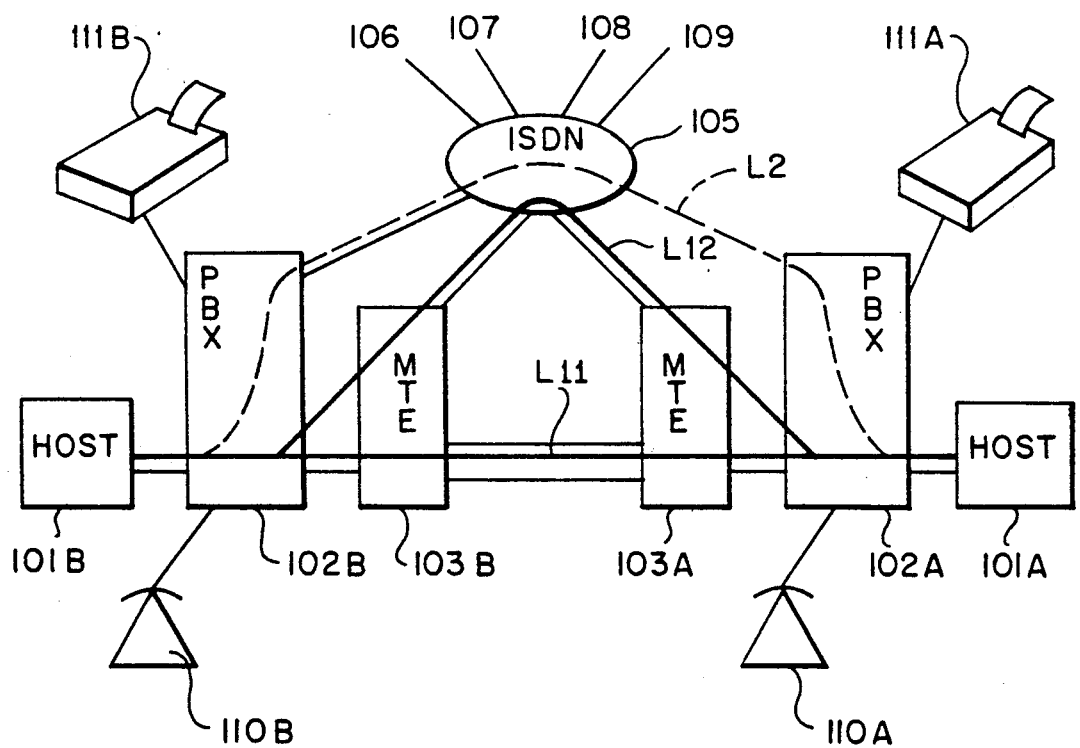
FIG. 16 is a block diagram showing the optimal parallel operation route for which the switch command is given by the integrated network management system.

The PBX network management system 107 receives the report of the overflow occurrence and enmergency first stage setting of the parallel operation circuit L12 from PBX (step 1101) as shown in FIG. 11 and reports the state to the integrated network management system 109 (step 1102). Upon receiving the reports of the overflow occurrence and setting of the parallel first stage operation circuit from the PBX network management system 107, the integrated network management system 109 gives the condition/influence examination instructions of other circuits to other network management systems 106m 108; after receiving the reports from the systems 106, 107, 108, the system 109 selects the optimal route L2 in accordance with the optimal route selection algorithm in the same way as in the case of a circuit break described above (step 1201). Here, the integrated network management system 109 compares performance between the present parallel operation route L12 and the optimal parallel operation route L2 (route evaluation value comparison) and judges whether or not the switch to the optimal parallel operation route L2 is made to be (step 1202). The difference between the route evaluation values is compared with the specific value and if the optimal route is judged superior, the switch proposal is adopted and if not, the switching operation is judged unnecessary (step 1202). If the switching operation is judged unnecessary, the parallel operation emergency route L12 is kept (step 1203) and if it is judged necessary, the switch instruction from the L12 circuit to the L2 circuit is given to the transmission network and PBX network management systems 106, 107 as shown in FIG. 16 (1204). As shown in FIGS. 13 and 14, upon receiving the switch instruction (step 1301, step 1401), the transmission network management system 106 and the PBX network management system 107 transmit the switch command to each equipment as the object of management (step 1302, step 1402) to set the optimal parallel operation route L12 as shown in FIG. 16 (step 1303, step 1403) as the second stage.

According to the construction and operation described above, it becomes possible to secure instantaneously the parallel operation route at the time of occurrence of the circuit overflow by utilizing effectively the communication nodes having the autonomous communication circuit parallel operation function, as the first stage, and to attain efficient circuit utilization when viewed from the aspect of the total communication network by switching the route to the optimal combined use route by the network management systems if the performance of the combined use route is high, as the second stage.

The second stage circuit switch/parallel operation use route indication may not be made by the integrated network management system 109, but by each sub-network management system, that is, the transmission network management system 106 or the PBX network management system 107.

The system configuration and operation are the same as shown in FIG. 3, but the sub-network management system 106 or 107 or 108 selects and instructs the optimal switch/parallel operation route on the basis of the information obtained from each management object network node.

Accordingly, the selected route is the optimal route inside the network of the network management system 106 or 107 or 108. Though this is not the optimal switch/parallel route as viewed from the total network system, the procedures for sending the information to the integrated management system, judging and instruction can be eliminated. Accordingly, the circuit switch/setting processing can be sped up. Thus, the second stage routing may be conducted by only one of the sub-network management systems 106, 107 or 108, or it may be accomplished by the integrated network management system in cooperation with the submanagement network systems, all as described above.

The two-stage circuit switch/parallel operation function may be determined by distributing the optimal switch/parallel operation route table that is prepared in advance in the integrated network management system 109, to the sub-network management systems 106, 107 and 108 periodically so that they can be used by the sub-network management system upon failure.

The integrated network management network system 109 prepares in advance the optimal switch/parallel operation route table on the basis of the present network information and distributes this table to each sub-network management system 106-108 so that each sub-network management system issues the circuit switch command of the second stage at the time of the circuit failures. The optimal switch/parallel operation table is prepared by, for example, making a mean value correspond to circuit efficiency which is the dynamically changeable item in the route evaluation algorithm set forth above. In this case, since the route to be selected is in accordance with the fixed routing table, it does not always result in the optimal route command for the communication network which changes dynamically. However, since the processing for the optimal route indexing/evaluation is not necessary, the switch processing of the second stage can be sped up particularly in a large scale communication network, and circuit utilization which is efficient to certain extents when viewed from the total communication network can be accomplished. In addition, therefore, there can be an integrated third stage switching performed by the integrated network management system 109 viewing the total communication system, as previously described, to follow the node first stage and sub-network second stage.

FIG. 17 shows more detail of a portion of the system where the communication control processor CCP 170 is between PBX 102 and the host computer 101, and where the CCP has the autonomous communication switch function. FIG. 17 shows the connection relation between PBX 102A, CCP 170 (another example of a communication node) and the host computer 101A. CCP and PBX are connected by three communication circuits 171-173 and the rest of the construction of the communication networks are the same as those in FIG. 1.

FIG. 18 shows the relation between the circuit switch route adopted autonomously by the CCP 170 at the time of circuit failure and the switch table 180 prepared inside the system. This CCP circuit switch table 180 shows that the LT3 circuit 173 is used normally, and the LT2 circuit 172 and the LT1 circuit 171 are used in this order as the stand-by circuits at the time of failure. The switch tables provided to the multiple transmission equipment 103 and PBX 102 may be the same as those shown in FIG. 2.

Next, an example of the switch operation in accordance with the communication circuit switching or parallel operation system will be explained with reference to FIGS. 19-24.

Figure 19:
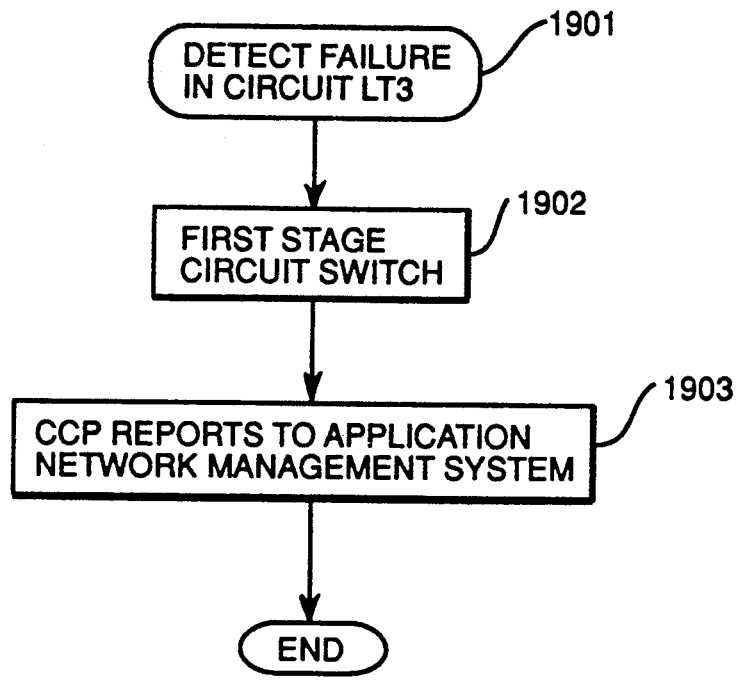
FIGS. 19 to 22 are flowcharts of switching or parallel operation executed autonormously by the CCP.
Figure 20:
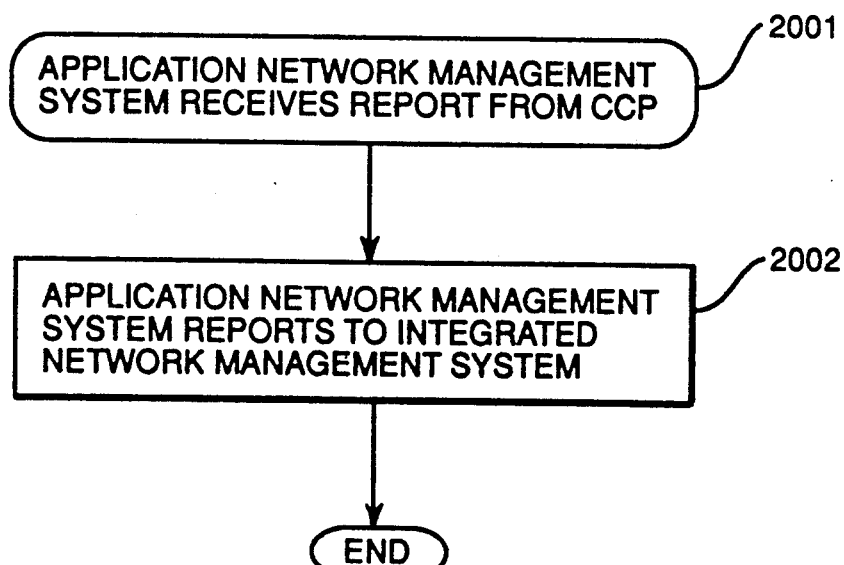
Figure 21:
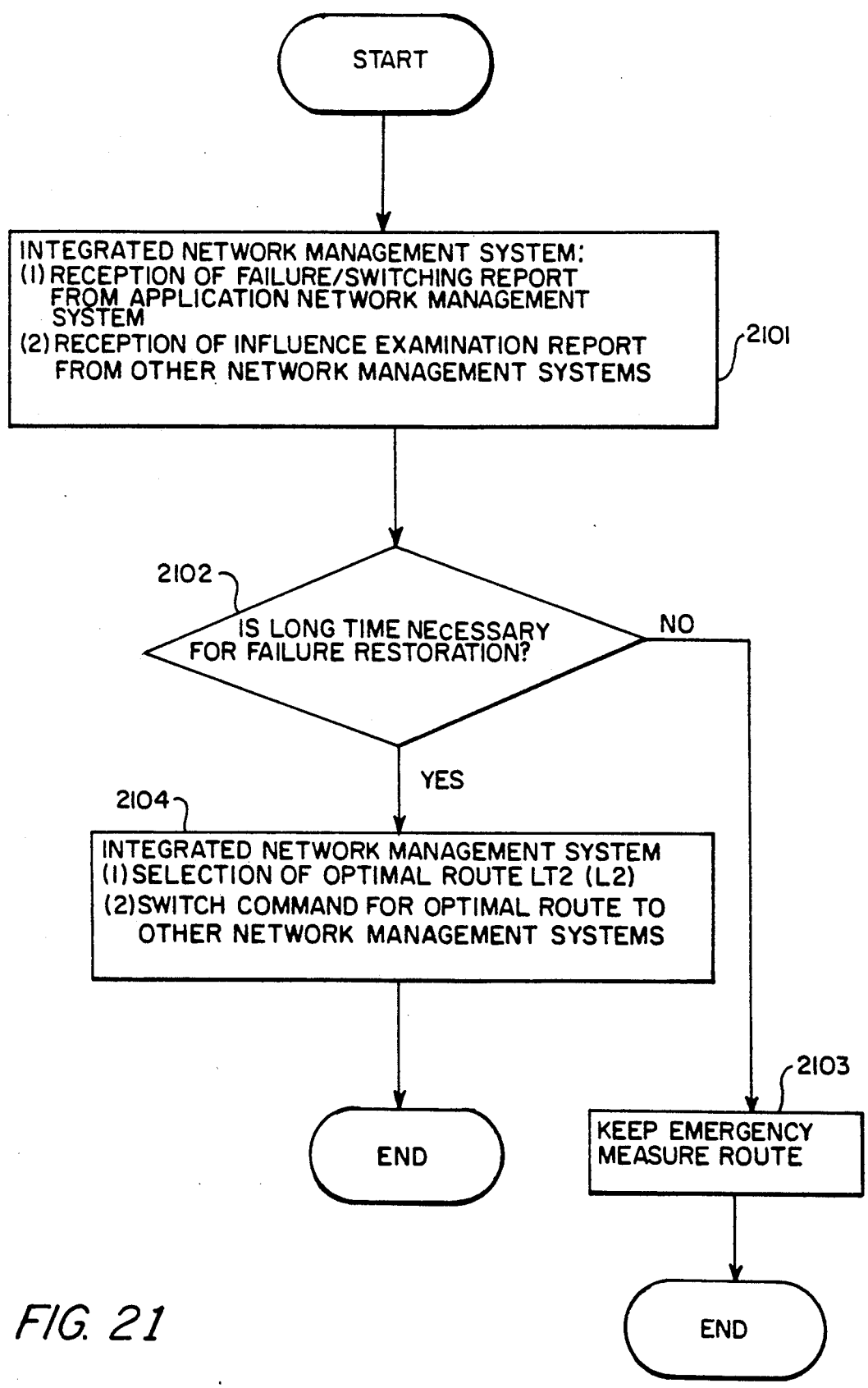
Figure 22:
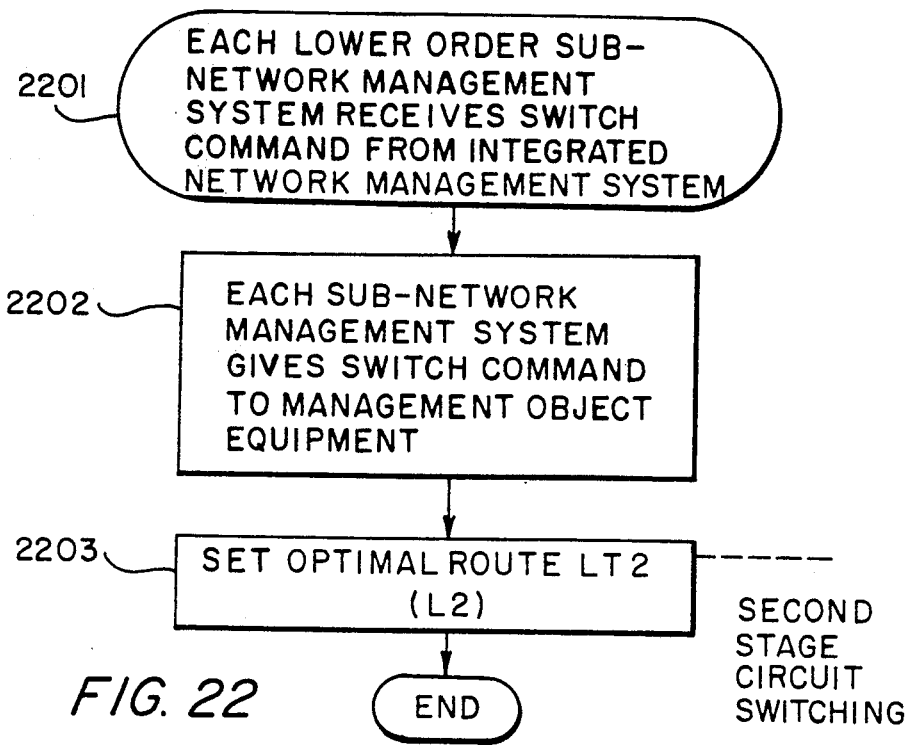
Figure 23:
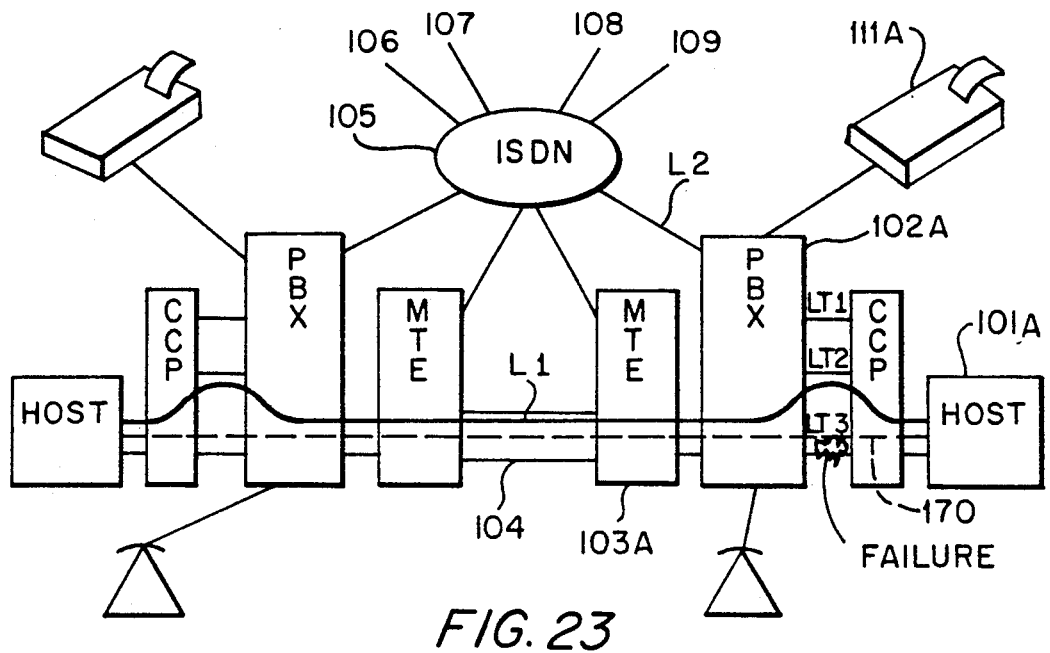
FIG. 23 is a block diagram showing the route selected by the circuit switching function of the CCP.
Figure 24:
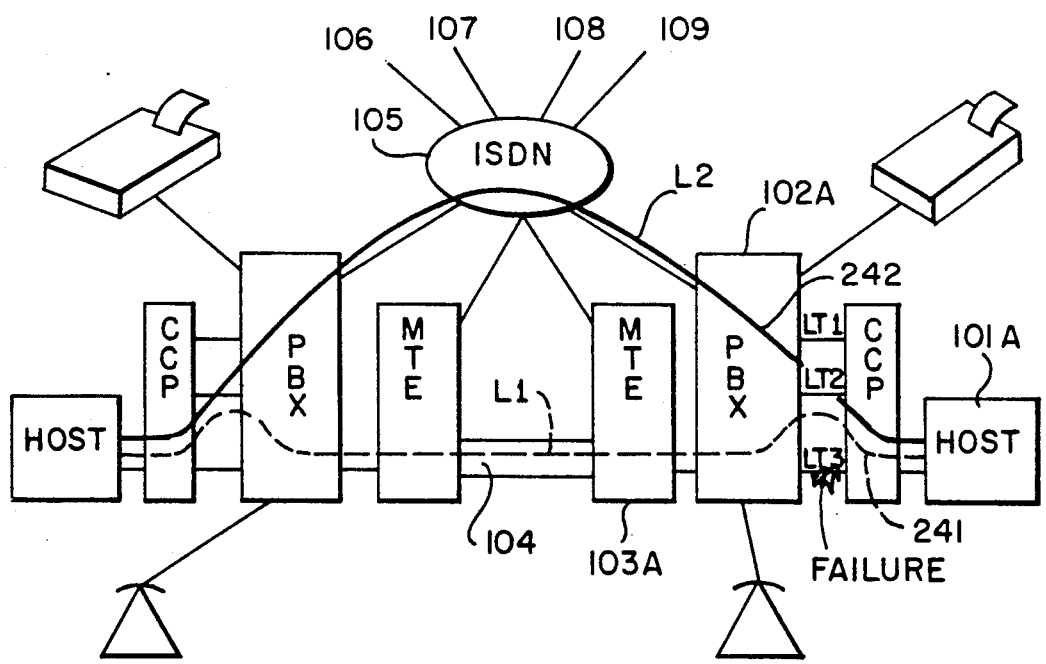

FIG. 19 shows the control flow when any failure occurs in the LT3 circuit in FIG. 23. When any failure occurs and is detected in the LT3 circuit 170 (step 1901), the communication circuit cannot be secured by the autonomous circuit switch between the multiple transmission equipment 103A and PBX 102A. Therefore, the communication control processor (CCP) 170 switches the circuit from LT3 to LT2 in accordance with the switch table 180 (step 1902) and secures the route for emergency routing of the first stage. CCP 170 reports the failure and the switch operation to the application network management system 108 (step 1903). The application network management system 108 receives the failure/switch report from the CCP (step 2001) as shown in FIG. 20 and reports them to the integrated network management system 109 (step 2002). The integrated network management system 109 as shown in FIG. 21, receives the failure/switch report from the application network management system, and lets or requests other network management systems examine the influences of the failure and report the result (step 2101). Whether the time necessary for the restoration of the failure is long or short is judged (step 2102) and if it can be restored within a short period, the route for the emergency measures is secured or maintained until restoration (step 2103). If the failure is judged to be one that will continue for a long time, the optimal route LT2 (L2) of circuit 242 is selected on the basis of the collected information described above and the switch command to reroute from the LT2 (L1) of circuit 241 to the LT2 (LT2) of circuit 242 is issued to each network management system, as shown in FIG. 22, (step 2104). Each network management system receives the switch command (step 2201) and transmits the switch command to each node equipment that as the object of management (step 2202) to set the optimal route LT2 (L2) as shown in FIG. 24 (step 2203).

According to the construction and operation described above, it becomes possible to utilize effectively the communication nodes having the autonomous routing, e.g. communication circuit switching or parallel operation function and to secure the communication circuit by the communication node of the upper hierarchy even when the switching operation by the communication node of the lower hierarchy is not possible. Furthermore, if a long time is judged to be necessary for the restoration of the circuit failure, effective and efficient utilization of the communication circuit, as viewed from the total network, can be accomplished by switching the route to the optimal route by the network management system.

An alternative method to the route evaluation algorithm described above will be described.

The route L is evaluated in accordance with the following evaluation algorithm and formulated as an integer programming problem by using, as the evaluation parameters, the communication circuit utilization cost X1 (a relative value when the most expensive circuit used is 1 and the most economical circuit used is 100), the margin X2 of circuit efficiency as performance of the communication circuit (a value 100−x with x representing efficiency (%)), the transmission speed X3 (a relative value when the highest speed circuit used is 100 and the lowest speed circuit used is 1), the transmission delay time as circuit quality (a relative value when the circuit having the smallest delay time used is 100 and the circuit having the greatest delay time is 1) and the error ratio (a relative value when the circuit having the smallest error ratio is 100 and the circuit having the greatest error ratio is 1), by using the weights a1–a6, respectively, and employing as the parameters for the user's switch requirement condition a communication circuit utilization cost $\alpha$, a transmission speed $\beta$, a transmission delay time $\gamma$ and an error ratio $\epsilon$:

$$\text{Maximize: } I(L) = \sum_{i=1}^{5} a_i x_i$$

condition: $\alpha < X_1, \beta < X_3, \gamma < X_4, \epsilon < X_5$

Figure 25:
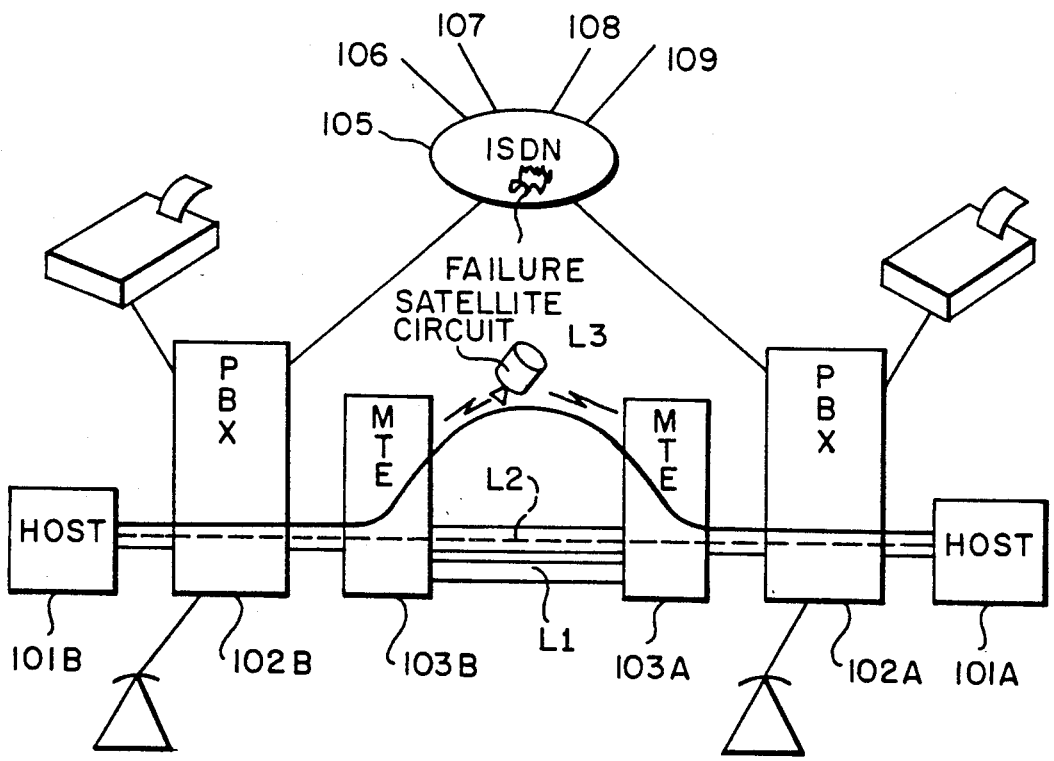
FIGS. 24 and 25 are block diagrams showing the optimal routes for which the switch command is given by the integrated network management system.

Here, the evaluation parameters X1 and X3 are fixed at the time of the circuit but X2, X4 and X5 change dynamically with the operation condition. The parameters $\alpha, \beta, \gamma$ and $\epsilon$ are as the switch requirement conditions from the users and are set by the users in advance as the requirements of the use circuit at the start of communication. When the number of standby routes is small, the evaluation values inside the route satisfying the condition of the evaluation algorithm is obtained for each of the routes that can be the standby routes by a count-up method and the route having the greatest evaluation value is selected as the optimal route. FIG. 25 is a structural view showing an example of the optimal route to which the switch command is given by the integrated network management system in accordance with this evaluation formula. The evaluation parameters, weights and users' requirement conditions used for this route selection are tabulated in Table 2 below. The system operation is the same as in the first and second embodiments.

TABLE 2

| Circuit | $X_1$ | $X_2$ | $X_3$ | $X_4$ | $X_5$ |
|---|---|---|---|---|---|
| L1 | 70 | 50 | 70 | 90 | 90 |
| L2 | 50 | 40 | 80 | 90 | 90 |
| L3 | 80 | 80 | 80 | 40 | 70 |
| weight ai | 3 | 2 | 3 | 2 | 3 |
| requirement | $\alpha = 50$ | — | $\beta = 80$ | $\gamma = 40$ | $\epsilon = 70$ |

When any failure occurs in the ISDN 105, PBX 102A or 102B first switches autonomously the communication circuit to the high speed digital circuit L2. However, when the integrated network management system 109 evaluates the high speed digital circuit L1, the circuit L2 and the satellite circuit L3 in accordance with the evaluation formula, it is found that the circuit L1 does not satisfy the users' requirement condition, the evaluation value I (L2) of the circuit L2 is "920" and the evaluation value I(L3) of the circuit L3 is "930". Accordingly, re-switching is made by selecting the satellite circuit L3 as the optimal route.

According to the evaluation algorithm just described above and to the operation using the same, it becomes possible to select the optimal route as viewed from the total communication network in the second stage circuit switching executed by the integrated network management system 109 in consideration of the users' requirements, and to accomplish effective and efficient utilization of the communication circuits.

In accordance with the present invention, the standby circuit can be secured rapidly at the time of the occurrence of any failure by the communication nodes having the autonormous circuit switching or parallel operation function, as a first stage. Furthermore, any adverse influences of the failure on the upper order networks can be prevented by executing the circuit switching or parallel operation function sequentially from the communication nodes belonging to a lower hierarchy such as the transmission network, the exchange network, and the like. This also becomes effective at the time of failure diagnosis because the object of failure or the range of diagnosis can be focused.

Furthermore, if the restoration of the failure requires a long time, the communication circuit is switched to the optimal route by the integrated network management system, as a second stage. Accordingly, effective and efficient utilization of the communication circuit can be accomplished in the aspects of the cost and performance as viewed from the total communication networkunitil the correction of the failure.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A communication system, comprising:
 a communication network including a plurality of communication nodes;
 management system means for managing said communication network;
 said communication nodes including routing means for autonomously executing emergency local routing at the time of occurrence of a failure as a first stage of routing control; and
 said management system means determining an optimal network global routing relative to said communication network as a whole after the emergency local routing, as a second stage of routing control, to replace the emergency local routing.

2. The communication system of claim 1, wherein said management system means, in response to information received from said communication nodes, determines an expected time for correcting the failure, and issues a command to the communication network to replace the emergency local routing with the optimal network global routing when the expected time exceeds a reference value.

3. The communication system of claim 1, wherein there are a plurality of said communication networks operatively interconnected as communication sub-networks of the system; and wherein said management system means includes a plurality of sub-network management system means respectively for each of said communication sub-networks.

4. The communication system of claim 3, wherein said management system means includes an integrated network management system means for managing said communication sub-network management system means, and said integrated network management system means having said function of determining the optimal network global routing.

5. The communication system of claim 3, wherein each of said communication sub-network management system means has said function of determining the optimal network global routing for its network.

6. The communication system of claim 3, wherein said management system means, in response to information received from said communication nodes, determines an expected time for correcting the failure, and issues a command to the communication network to replace the emergency local routing with the optimal network global routing when the expected time exceeds a reference value.

7. The communication system of claim 4, wherein said management system means, in response to information received from said communication nodes, determines an expected time for correcting the failure, and issues a command to the communication network to replace the emergency local routing with the optimal network global routing when the expected time exceeds a reference value.

8. The communication system of claim 5, wherein said management system means, in response to information received from said communication nodes, determines an expected time for correcting the failure, and issues a command to the communication network to replace the emergency local routing with the optimal network global routing when the expected time exceeds a reference value.

9. The communication system of claim 4, wherein each of said sub-network management system means receives control information from the communication nodes within its sub-network and reports both failures and the influence of failures upon its sub-network to said integrated network management system means.

10. The communication system of claim 9, wherein said management system means, in response to information received from said communication nodes, determines an expected time for correcting the failure, and issues a command to the communication network to replace the emergency local routing with the optimal network global routing when the expected time exceeds a reference value.

11. The communication system of claim 4, wherein said determining means determines the optimal network global routing on the basis of information from all of said sub-networks.

12. The communication system of claim 11, wherein said management system means, in response to information received from said communication nodes, determines an expected time for correcting the failure, and issues a command to the communication network to replace the emergency local routing with the optimal network global routing when the expected time exceeds a reference value.

13. The communication system of claim 9, wherein said integrated network management system means determines the optimal network global routing on the basis of information from all of said sub-network management systems.

14. The communication system of claim 13, wherein said management system means, in response to information received from said communication nodes, determines an expected time for correcting the failure, and issues a command to the communication network to replace the emergency local routing with the optimal network global routing when the expected time exceeds a reference value.

15. The communication system of claim 3, wherein said communication nodes are of different equipment types, and all of the communication nodes of one equipment type are managed by a sub-network management system means specific to that type.

16. The communication system of claim 15, wherein the types of communication nodes and sub-networks include transmission, PBX, and application.

17. The communication system of claim 15, including means controlling execution of said autonomous emergency local routing for all communication nodes of each type with a hierarchy of execution that differs between types.

18. The communication system of claim 15, wherein the types of communication nodes and sub-networks are transmission, PBX and application; and including means controlling execution of said autonomous emergency local routing for all communication nodes of each type with a hierarchy of execution that differs between types, for executing the emergency local routing at a substantially fixed time after detection of failure so that the fixed times differ between communication node types sufficiently to effectively completely execute local routing by one communication node type in time that the other communication node types will not execute emergency local routing, in the order of hierarchy.

19. The communication system of claim 18, wherein said fixed time for the transmission equipment type of equipment is shorter to provide a more preferential hierarchy than the fixed time and hierarchy of the PBX type of equipment.

20. The communication system of claim 18, wherein said communication nodes include packed exchange type of equipment; and said fixed time for the transmission equipment type of equipment is shorter to provide a more preferential hierarchy than the fixed time and hierarchy of the packet exchange type of equipment.

21. The communication system of claim 18, wherein said communication nodes include communication control processors, CCP's and said fixed time for the transmission equipment type of equipment is shorter to provide a more preferential hierarchy than the fixed time and hierarchy of the communication control processor CCP type of equipment.

22. The communication system of claim 1, wherein said management system means includes a transmission sub-network management system means for managing a transmission sub-network of a plurality of communication nodes that are transmission equipment;
said management system means further including PBX sub-network management system means for managing an exchange sub-network of PBX type communication nodes;
said management system means further including application sub-network management system means for managing an application sub-network composed of application communication nodes being a plurality of at least one of terminals and host computers; and
said management system means further including integrated network management system means for collecting information on causes of failure from said sub-network management system means and information on influence of failures from said sub-network management system means.

23. The communication system of claim 22, wherein each of said communication nodes includes means for autonomously reporting failures to its respective sub-network management system means; and
each of said sub-network management system means including means for reporting failures reported from its communication nodes to said integrated network management system means and reporting information as to the influence of failures within its sub-network to said integrated network management system means.

24. The communication system of claim 22, wherein said integrated network management system means includes means for querying said sub-network management system means, upon receipt of a report of failure, as to the influences of failures upon the respective sub-networks.

25. The communication system of claim 22, wherein each of said sub-network management system means has said means determining an optimal network global routing with respect to its sub-network autonomously in response to receipt of a failure report from its communication nodes.

26. The communication system of claim 23, wherein said integrated network management system means includes said means determining an optimal network global routing with respect to all of said sub-networks in response to said report of failure and said information on influences of failures from said sub-network management system means.

27. The communication system of claim 1, wherein said means determining optimal network global routing includes means storing an operation route table that determines different optimal global routing for corresponding different failures.

28. The communication system of claim 22, wherein said means for determining an optimal network global routing includes means storing an operation route table that determines different optimal global routing for corresponding different failures and failure influences.

29. The communication system of claim 28, wherein said means for determining periodically updates said table by dynamically changing said optimal routing within said table according to changing conditions within the network system.

30. The communication system of claim 27, wherein said means for determining periodically updates said table by dynamically changing said optimal routing within said table according to changing conditions within the network system.

31. The communication system of claim 30, wherein said means for determining distributes said routing table periodically to said sub-network management system means to be used by said sub-network management system means in determining the optimal global routing as the second stage.

32. The communication system of claim 23, wherein said integrated network management system means includes means for querying said sub-network management system means, upon receipt of a report of failure, as to the influences of failures upon the respective sub-networks.

33. The communication system of claim 32, wherein each of said sub-network management system means has said means determining an optimal network global routing with respect to its sub-network autonomously in response to receipt of a failure report from its communication nodes.

34. The communication system of claim 33, wherein said integrated network management system means includes said means determining an optimal network global routing with respect to all of said sub-networks in response to said report of failure and said information on influences of failures from said sub-network management system means.

35. The communication system of claim 34, wherein said means determining optimal network global routing includes means storing an operation route table that determines different optimal global routing for corresponding different failures.

36. The communication system of claim 35, wherein said means for determining distributes said routing table periodically to said sub-network management system means to be used by said sub-network management system means in determining the optimal global routing as the second stage.

37. The communication system of claim 32 wherein said integrated network management system means includes said means determining an optimal network global routing with respect to all of said sub-networks in response to said report of failure and said information on influences of failures from said sub-network management system means.

38. The communication system of claim 37, wherein said means determining optimal network global routing includes means storing an operation route table that determines different optimal global routing for corresponding different failures.

39. The communication system of claim 38, wherein said means for determining distributes said routing table periodically to said sub-network management system means to be used by said sub-network management system means in determining the optimal global routing as the second stage.

40. The communication system of claim 32, wherein said means determining optimal network global routing includes means storing an operation route table that determines different optimal global routing for corresponding different failures.

41. The communication system of claim 23, wherein said integrated network management system means includes means for querying said sub-network management system means, upon receipt of a report of failure, as to the influences of failures upon the respective sub-networks.

42. The communication system of claim 23, wherein each of said sub-network management system means determines an optimal network global routing with respect to its sub-network autonomously in response to receipt of a failure report from its communication nodes.

43. A communication method for a communication network including a plurality of communication nodes, comprising:

autonomously executing emergency local routing at the time of occurrence of a failure as a first stage of routing control; and determining an optimal network global routing relative to the communication network as a whole after the emergency local routing, as a second stage of routing control, to replace the emergency local routing.

44. The communication method of claim 43, wherein in response to information received from the communication nodes, determining an expected time for correcting the failure, and issuing a command to the communication network to replace the emergency local routing with the optimal network global routing when the expected time exceeds a reference value.

45. The communication method of claim 43, including connecting a plurality of communication networks operatively as communication sub-networks of the system; and separately managing each of the sub-networks.

46. The communication method of claim 45, including an integrated managing of said steps of managing each of the sub-networks with said step of determining the optimal network global routing.

47. The communication system of claim 45, wherein said step of determining the optimal network global routing is conducted by each of said steps of managing each of the sub-networks.

48. The communication method of claim 45, wherein in response to information received from the communication nodes, determining an expected time for correcting the failure, and issuing a command to the communication network to replace the emergency local routing with the optimal network global routing when the expected time exceeds a reference value.

49. The communication method of claim 46, wherein in response to information received from the communication nodes, determining an expected time for correcting the failure, and issuing a command to the communication network to replace the emergency local routing with the optimal network global routing when the expected time exceeds a reference value.

50. The communication method of claim 47, wherein in response to information received from the communication nodes, determining an expected time for correcting the failure, and issuing a command to the communication network to replace the emergency local routing with the optimal network global routing when the expected time exceeds a reference value.

* * * * *